(12) United States Patent
Pecar et al.

(10) Patent No.: US 8,387,212 B2
(45) Date of Patent: Mar. 5, 2013

(54) DEVICE FOR FASTENING A HINGE TO AN EXTRUDED PROFILE

(75) Inventors: David Pecar, Koper (SI); Danjel Kozlovic, Dekani (SI); Valmi Valentic, Smarie (SI)

(73) Assignee: Lama D.D. Okovje—Montazni Sistemi—Orodja—Trgovina, Dekani (SI)

( * ) Notice: Subject to any disclaimer, the term of this patent is extended or adjusted under 35 U.S.C. 154(b) by 128 days.

(21) Appl. No.: 12/451,546

(22) PCT Filed: Jan. 21, 2009

(86) PCT No.: PCT/SI2009/000002
§ 371 (c)(1),
(2), (4) Date: Nov. 18, 2009

(87) PCT Pub. No.: WO2009/093985
PCT Pub. Date: Jul. 30, 2009

(65) Prior Publication Data
US 2010/0074682 A1 Mar. 25, 2010

(30) Foreign Application Priority Data
Jan. 22, 2008 (SI) .................... P-200800015

(51) Int. Cl.
*E05D 7/04* (2006.01)
(52) U.S. Cl. ....... 16/242; 16/248; 16/DIG. 43; 403/253; 403/257
(58) Field of Classification Search .................. 403/253, 403/254, 256, 257; 16/242, 243, 246, 247, 16/248, 249, 382, 383, 387, DIG. 43
See application file for complete search history.

(56) References Cited

U.S. PATENT DOCUMENTS

| 3,263,368 A | * | 8/1966 | Hildum et al. | 16/247 |
| 4,547,930 A | * | 10/1985 | King et al. | 16/382 |
| 5,603,142 A | * | 2/1997 | Dubach et al. | 16/247 |
| 6,862,858 B2 | | 3/2005 | Salice | 52/584.1 |

FOREIGN PATENT DOCUMENTS

| DE | 29621197 | | 2/1997 |
| DE | 10345758 | | 4/2005 |
| EP | 0 856 626 | * | 8/1998 |
| EP | 000349626-0001 | | 6/2005 |
| WO | 2006097178 | | 9/2006 |
| WO | 2007042132 | | 4/2007 |
| WO | 2008000320 | | 1/2008 |

OTHER PUBLICATIONS

EPO Machine Translation. gb.espacenet.com: EP 0 856 626.*

* cited by examiner

*Primary Examiner* — Michael P Ferguson
(74) *Attorney, Agent, or Firm* — Jacobson Holman PLLC

(57) ABSTRACT

A device for fastening an object, preferably a hinge, to an extruded profile. The device includes a sliding block that is connected in a known way with the a hinge arm via webs on the upper surface of the block, and having one lateral surface on the bottom side ended by a longitudinal snap tooth, and another lateral surface ended in an undergrabbing prong. The fastening device includes at least one pair of resilient elements. The resilient elements are arranged in cutouts formed on the bottom side of the sliding block symmetrically with respect to the main axis of the hinge. The resilient element is arranged in the cutout in a way to protrude from the said the sliding block in the area of the lateral wall of the sliding block.

11 Claims, 4 Drawing Sheets

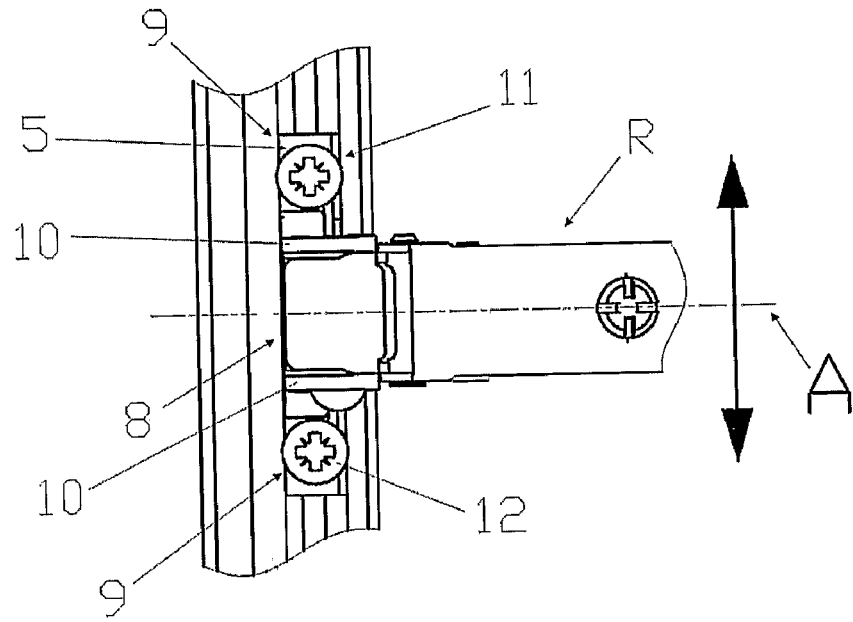
Fig. 5
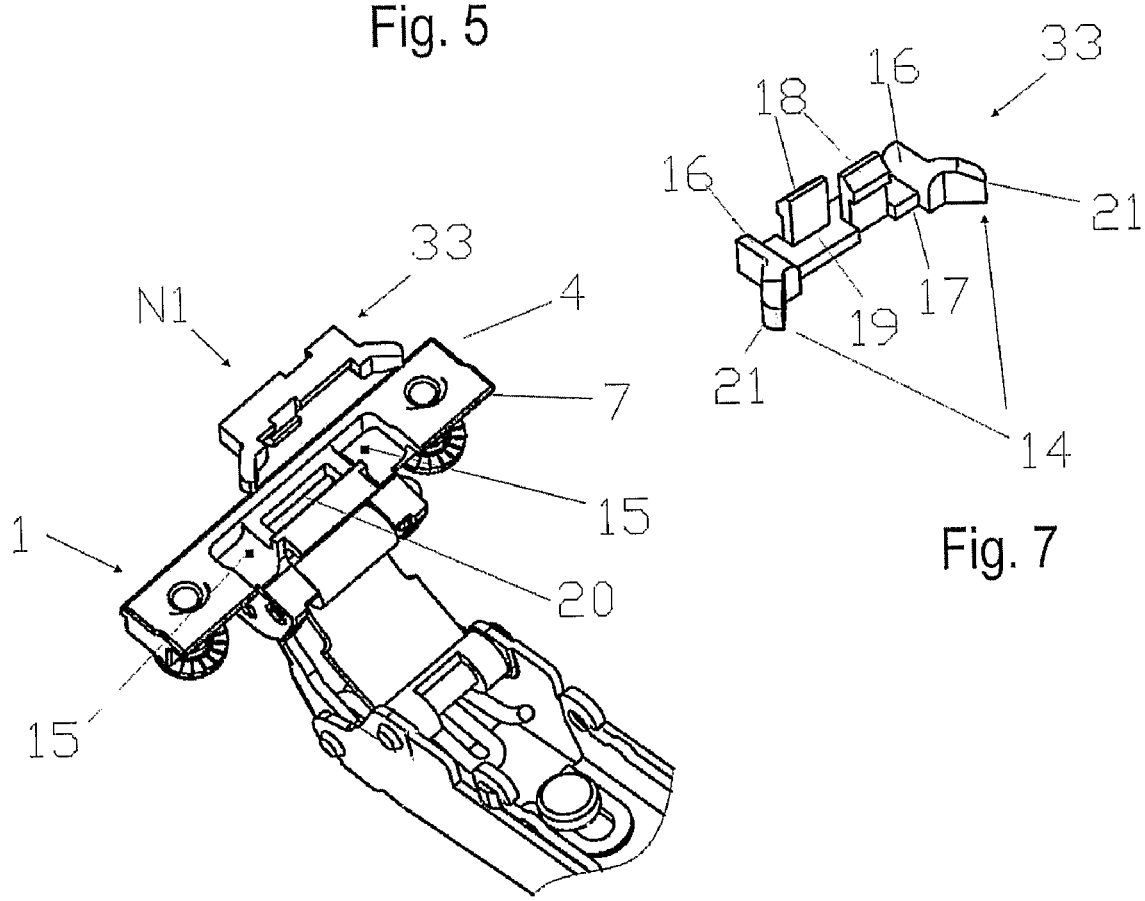
Fig. 7
Fig. 6

DEVICE FOR FASTENING A HINGE TO AN EXTRUDED PROFILE

This is a national stage of PCT/SI09/000,002 filed Jan. 21, 2009 and published in English, which has a priority of Slovenia no. P-2008 0 0015 filed Jan. 22, 2008, hereby incorporated by reference.

FIELD OF THE INVENTION

The subject of the present invention is a device for fastening an object, preferably a hinge, to an extruded profile.

BACKGROUND OF THE INVENTION

A technical problem solved by the present invention is how to design such device for fastening an object, preferably a hinge, more precisely a hinge cup, to an extruded profile, which device will allow for the movement inside the extruded profile in order to position an object, without a danger for said device to fall out from the profile, and will—after the object has been positioned into a selected position—allow for a simple fastening in the extruded profile.

PRIOR ART

In the field of furniture industry glass is used as a carcass part of furniture, especially as a door wing. Such door wing may be formed merely as a glass panel fastened by means of a special hinge to a carcass wall or built into an extruded frame, normally of aluminium, which is fastened to the wall of the carcass by means of a hinge comprising a device for fastening into such frame.

EP 1 255 012 discloses a device for fastening a hinge part, more precisely a hinge cup, in the form of a baseplate with an block integrally formed at the bottom side, which engages with the opening of the groove of same profile when the cup part is positioned. The baseplate and the modified block comprise at least one coaxial through hole which terminates in the baseplate as a shaped deepening. In the through hole there is a pin, one end of which is designed on the side of the baseplate as a head with a protrusion and a screwdriver notch. Another end of the pin has a triangular cross-section and engages with the coaxial triangular opening of the tailored washer placed on the bottom side of said pin. The protrusion of said pin head and the hole deepening are formed in a way that the deepening allows for a pin rotation by approximately 90°. The washer is rotated simultaneously with said pin thus snatching under the lateral surface of the web of said profile groove, said web facing the interior of said notch. The shift of the hinge cup toward the pin axis is prevented by the baseplate abutting the opposite surface of the web. The described device for the fastening of a hinge cup to an extruded profile allows for the positioning of said cup onto the profile without prior drilling or cutting into same and thus optional positioning of the profile. A device of this type provides for a sliding movement in direction of the longitudinal axis of said profile, however, said device may fall out from said profile before being fixed in the profile. Due to this reason positioning is very difficult and there is a constant danger for said device to fall out from said profile together with the hinge and consequently for the furniture wing to fall out.

A device for fastening a hinge, more precisely a hinge cup, to an extruded profile is also known from RCD 000349626-0001 of the applicant, said profile being protected by said registered design. Said extruded profile is formed as two mutually parallel U-profiles of various widths being in contact with flanges, wherein the external flange of the U-profile of the larger width is inclined towards the interior of the groove and terminated at its free end by an inwardly folded flap. The U-profile of the larger width has a widening protrusion in the internal side of the web along the longitudinal axis of the web, against which the fixing element of the fastening device is leaned, and a stepped formed flange towards the interior of the groove. The total width of the profile is larger than any height of the flange of an individual U-profile. The U-profile of the larger width is intended to receive the fastening device, whereas the U-profile of the smaller width is intended to receive a glass panel.

The hinge arm is fastened to said extruded profile, more precisely in the U-groove of the larger width, via hinge cup and a fastening device that is materially locked therewith. Said fastening device is designed as a sliding block arranged rectangularly to the main hinge axis, one lateral surface of said block being terminated at the lower side by a longitudinal snap tooth and another lateral surface being terminated by an undergrabbing prong, wherein the latter is tailored to the lower surface of the sliding block. The upper surface of the sliding block has a central section delimited at each side by a web, into which said hinge arm is fastened in a known way, and two end sections comprising at least one hole, through which a fastening element reaches. The fastening device in the extruded profile is inserted in the U-groove of the larger width so that it snaps with the longitudinal snap tooth into the stepped flange and/or grabs under the flap of the flange with the undergrabbing prong. The sliding block may be inserted in the groove, since there is a very loose relation between the sliding block and the groove. Said fastening device may be slidingly moved within the groove, which provides for an optional positioning of the hinge along the height of the groove. Despite the described design of the fastening device with a tooth and a prong, the latter do not prevent its falling out from the groove when said device is not fixed. The fastening device may swing around the base of the tooth and fall out. Such fastening device not only renders positioning harder, moreover, there is a danger for the furniture wing or glass intended to be fastened to the carcass to fall out.

SUMMARY OF THE INVENTION

The described technical problem is solved by the device of the invention for fastening an object, preferably a hinge, consisting of a hinge arm and a hinge cup, to an extruded profile, wherein said device comprises a sliding block which is connected to a hinge arm in a conventional way via web arranged on the upper surface of said block, wherein by said sliding block comprises one lateral surface at the lowerbottom side terminated by a longitudinal snap tooth and another lateral surface terminated by an undergrabbing prong, the essential characteristic of said device being in the fact that at least a pair of resilient elements are needed for fastening, said elements being arranged in cutouts at the bottom side of said sliding block symmetrically to the main axis of the hinge. The cutouts are formed as unilaterally open grooves with an opening at the lateral side containing a prong. Each resilient element is designed in a way that it protrudes from said sliding block after it had been positioned within each cutout on the lateral side of said sliding block. Said sliding block may dispose of further drilled holes to meet a need for fastening a resilient element into said fastening device. The resilient element may be designed in diverse variants and be made of a variety of materials.

By positioning said fastening device into the notch of the extruded profile, the resilient element sinks into the interior of the cutout or against the lateral wall of said sliding block as the embodiment may be. With said fastening device being positioned with said sliding block in the groove of the extruded profile, which means that the bottom surface of said sliding block lies on the longitudinal protrusion of the groove, the resilient element pushes said sliding block due to the bias force in transversal direction of the groove against the second, stepped flange of the groove, against which the snap tooth snaps. The undergrabbing prong simultaneously grabs under the flap of the opposite slanted flange. Said sliding block and said fastening device therewith are fastened in the U-groove of a larger width of the extruded profile in a way that a sliding movement is possible within the groove, whereby said device cannot fall out from the groove due to the bias force of the resilient element. After positioning is over, said fastening device is fixed in the groove by at least one fixed element in the form of a screw, a wedge element or the like.

BRIEF DESCRIPTION OF THE DRAWINGS

The invention will now be described in more detail by a description of embodiments and enclosed drawings, in which:

FIG. 5 shows the fastening device of the invention inserted in the profile, top view, FIG. 6 shows the fastening device of the invention with a resilient element, bottom view, exploded view, FIG. 7 shows the resilient element from FIG. 4.

DETAILED DESCRIPTION OF THE PREFERRED EMBODIMENTS

Figure 1:
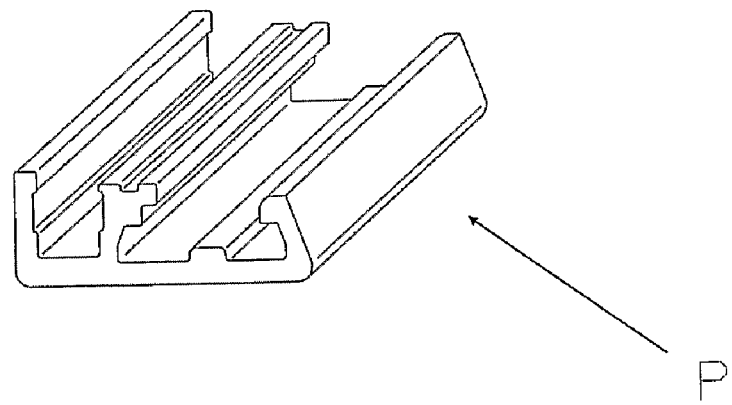
FIG. 1 shows an extruded profile, on which a hinge is fastened, prior art.
Figure 2:
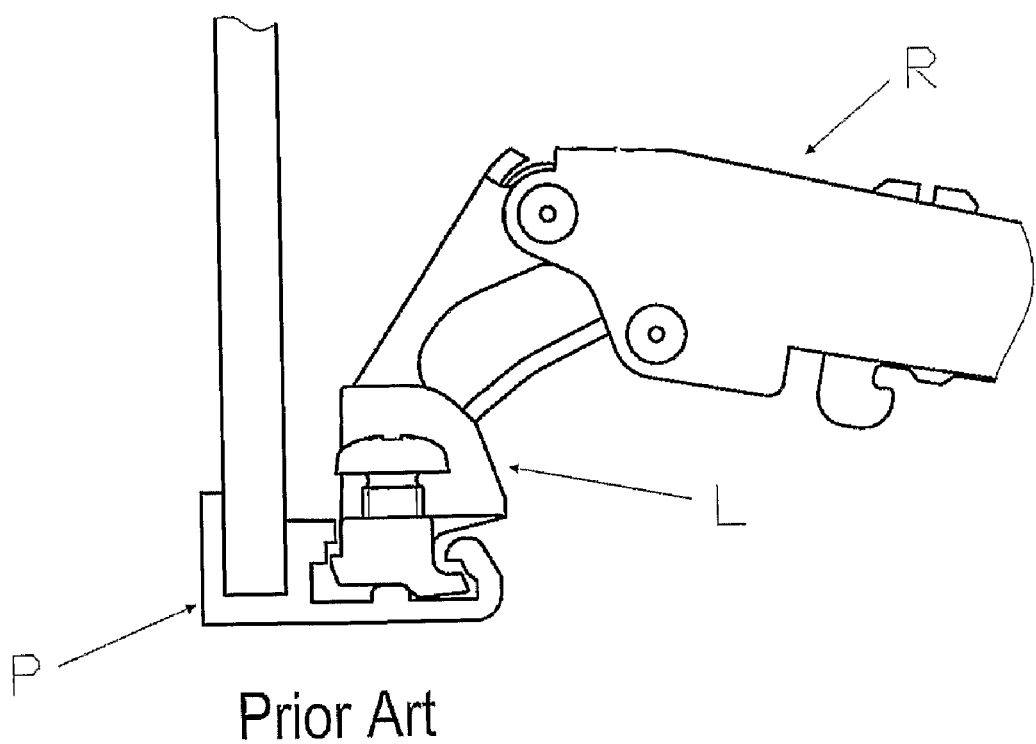
FIG. 2 shows the applicant's device for fastening to an extruded profile, shown in FIG. 1, inserted into the profile and not yet fixed, prior art.
Figure 3:
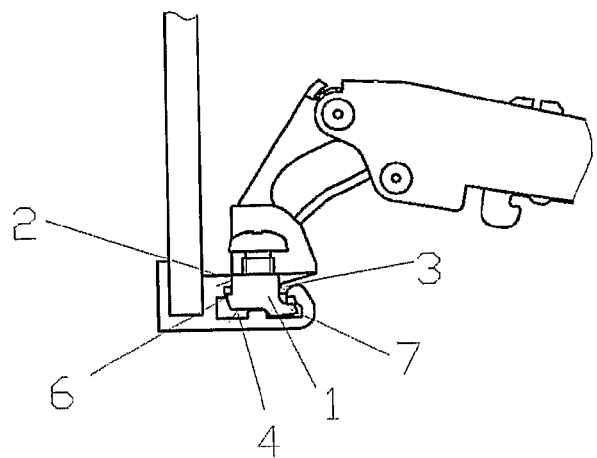
FIG. 3 shows the fastening device of the invention to be fixed to an extruded profile, shown in FIG. 1, inserted in the profile and not yet fixed.
Figure 11:
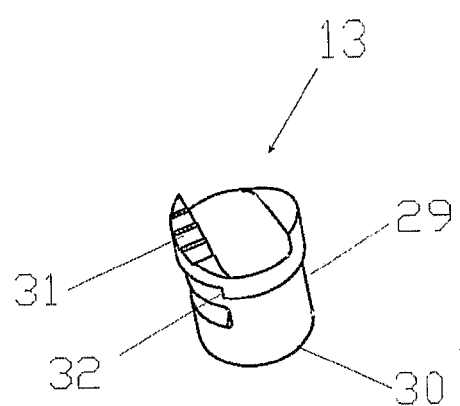
FIG. 11 shows a fixing element in the form of a wedge element.
Figure 4:
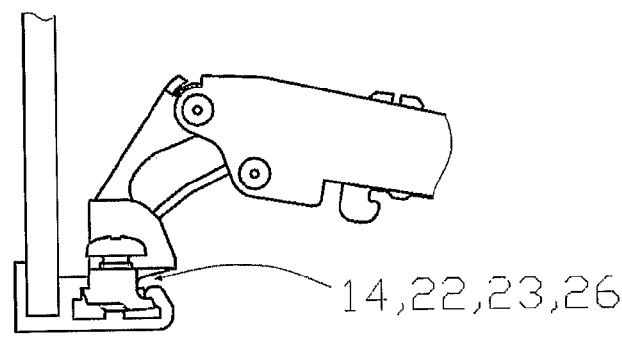
FIG. 4 shows the fastening device of the invention for fastening to an extruded profile, shown in FIG. 1, inserted in the profile and fixed.

A hinge arm R that is a constituent part of the hinge is fastened to an extruded profile P, via hinge cup L and a fastening device N1, N2, N3, N4 that is materially locked with the cup. The device N1, N2, N3, N4 is designed as a sliding block 1 arranged rectangularly to the main axis A of the hinge arm R, one lateral surface 2 of which is ended terminated on its bottom side by a longitudinal snap tooth 6, and another lateral surface 3 ends is terminated by an undergrabbing prong 7, wherein the latter is integrally formed to the bottom surface 4 of the sliding block 1. The upper surface of said sliding block 1 has a central section 8 limited on each side by a web 10, into which a hinge arm R is fastened in a known way, and two end sections 9 comprising at least one hole 11, through which protrudes a fixing element 12 or 13 protrudes.

The fastening device N1, N2, N3, N4 comprises at least one pair of resilient elements 14, 22, 23, 26 arranged in cutouts 15 symmetrically to the main axis A of said hinge arm R, said cutouts 15 being arranged on the bottom side 4 of said sliding block 1. Said cutouts 15 are formed as unilaterally open grooves with an opening on the lateral side 3 comprising a prong 7. Each resilient element 14, 22, 23, 26 is formed in a way that after having been positioned in a respective cutout 15 on the lateral side 3 of said sliding block 1 it protrudes from said sliding block 1. For the needs of fastening said resilient element 14, 22, 23, 26 into said fastening device N1, N2, N3, N4, said sliding block 1 may dispose of additional drilled holes 24. Said resilient element 14, 22, 23, 26 is made of a material having elastic properties, for instance of a plastic material, a metallic material.

The fastening device N1 from FIG. 6 comprises on the bottom side of the sliding block 1 a pair of resilient elements 14 arranged in cutouts 15 on the bottom side 4 of the sliding block 1, said cutouts 15 being arranged symmetrically to the longitudinal axis A of the hinge arm R. Each resilient element 14 is formed as a web 16 with a tailored tongue 21. The tops of tongues 21 are open in the described embodiment. Other embodiments of the resilient element are possible, the tops of said element facing each other. Said resilient elements 14 are mutually connected in the area of webs 16 with a linking element 17 into an integral part 33. Two snap webs 18 are integrally formed to a wider surface 19 of the linking part 17, said webs 18 engaging in the installed state with the snap cutout 20 arranged between both cutouts 15. Each resilient element 14 is designed in a way that after being positioned in a respective cutout 15 one part of the integrally formed tongue 21 protrudes from said sliding block 1 in the area of the lateral wall 3 of said sliding block 1.

Figure 8:
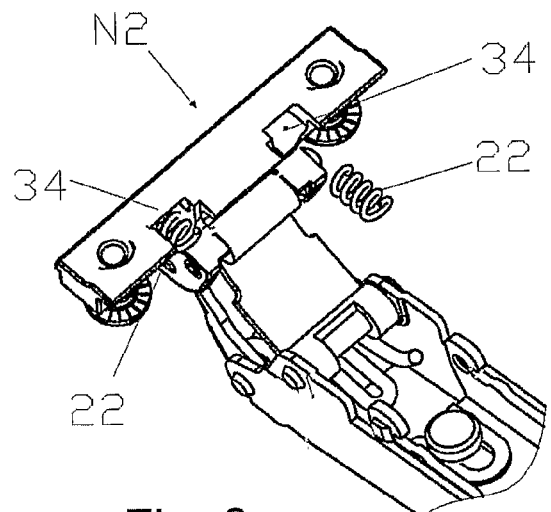
FIG. 8 shows the fastening device of the invention with the resilient element formed as a coil spring, bottom view, second embodiment.

The fastening device N2 from FIG. 8 comprises on the bottom side 4 of the sliding block 1 a pair of resilient elements in the form of a coil spring 22, said elements being arranged in the cutouts 15 in the form of a blind hole on the bottom side 4 of said sliding block 1. Each coil spring 22 is designed in a way that after having been positioned in a respective cutout 15 part of the spring 22 protrudes from said sliding block 1 in the area of the lateral wall 3.

Figure 9:
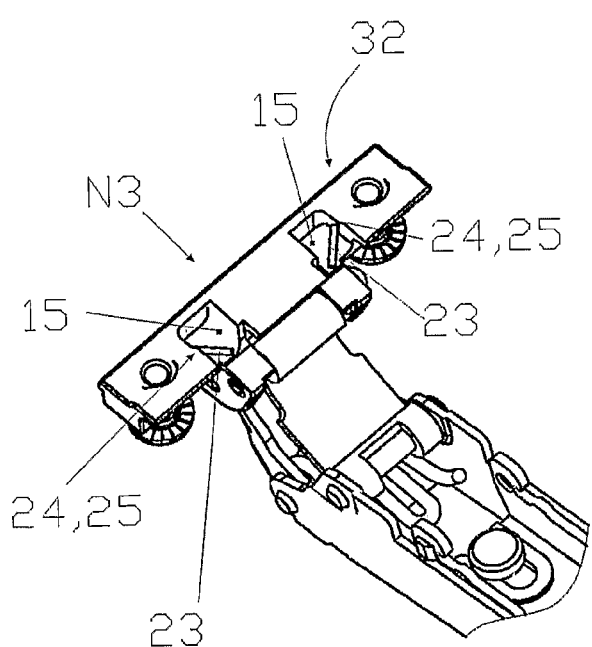
FIG. 9 shows the fastening device of the invention with the resilient element formed as a wire spring, bottom view, third embodiment.

The fastening device N3 from FIG. 9 comprises on the bottom side 4 of the sliding block 1 a pair of resilient elements in the form of wire springs 23 arranged in the cutouts 15 on the bottom side 4 of said sliding block 1. Each wire spring 23 reaches with one of its ends into a hole 24 on the lateral side 25 of each cutout 15, wherein the end has a hook-like terminal fitting into a deepening 32 on the lateral side 2 of said sliding block 1. Another, free end of the wire spring 23 protrudes from said sliding block 1 within the area of the lateral wall 3.

Figure 10:
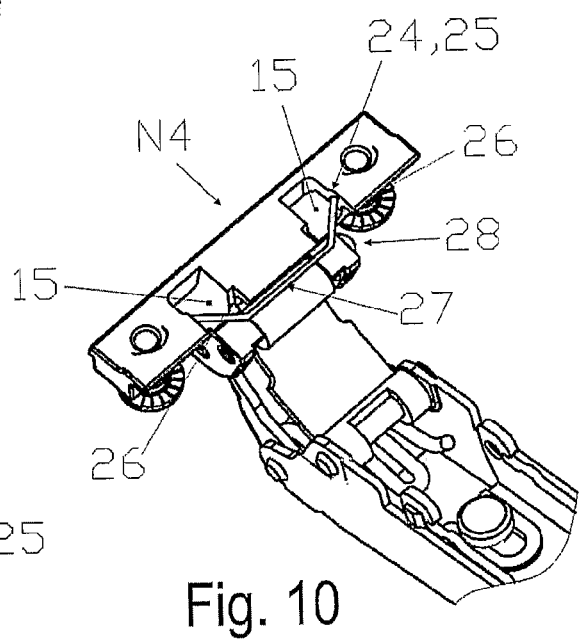
FIG. 10 shows the fastening device of the invention with the resilient element formed as an arc wire spring, bottom view, fourth embodiment.

The fastening device N4 from FIG. 10 comprises on the bottom side 4 of the sliding block 1 a pair of resilient elements in the form of wire springs 26 mutually linked by an arc part 27 into an integral arc wire spring 28 arranged in the cutouts 15 on said bottom side 4 of said sliding block 1. The arc wire spring 28 is fastened with its free ends into respective slanted holes 24 on the lateral wall 25 of a respective cutout 15. The arc part 27 of said arc wire spring 28 protrudes from said sliding block 1 within the area of the lateral wall 3 of said sliding block 1.

The fastening device N1, N2, N3, N4 is fixed in the notch of the profile P by at least one fixing element formed as a screw 12, a wedge element 13 or the like. When screwed in said block 1 said screw 12 fits with its stem to the protrusion of the groove and pushes it away from the bottom of the groove, so that said block 1 wedges with its tooth 6 into the step of the groove flange, wherein said fastening device N1, N2, N3, N4 is fixed in the groove and thus simultaneously in the profile P. Said wedge element 13 is formed as a pin 29, one end of which is formed as a head 30 with a nest for a screwdriver and has on its front surface of the second end integrally formed at least one wedge 31, preferably two wedges oriented in opposite directions and being diametrically moved apart. In order to provide for a more considerable force of wedging, said wedge 31 may be of a saw type. A limiting level 32 is arranged on the circumference of said pin 29, said level 32 fitting the step on the circumference of the screw hole while said pin 29 is rotated, thus limiting the rotation of said pin 29 to 90°. Said wedge 31 gets wedged at the longitudinal protrusion of the groove of the profile P and pushes said block 1 from the bottom of the groove.

It is understood that a man skilled in the art may conceive other changes in the embodiments by knowing the above description of the invention without circumventing the essence of the invention defined in the appended claims.

The invention claimed is:

1. A device for fastening a hinge to an extruded profile member having a longitudinally extending channel having an opening and opposed longitudinally extending undercut portions on opposing sides of said opening opposite a bottom surface of said channel, said device comprising:
    a sliding block having opposing upper and lower surfaces and opposing longitudinally extending lateral surfaces, said upper surface of said sliding block having a pair of webs pivotably connected with a hinge arm along a pivot axis parallel to a longitudinal axis of said sliding block, said sliding block being positionable within said channel such that said webs extend outwardly through said opening,
    one of said lateral surfaces of said sliding block defining a snap tooth longitudinally extending along a lateral edge of said lower surface of said sliding block,
    the other of said lateral surfaces of said sliding block defining an undergrabbing prong longitudinally extending along an opposing lateral edge of said lower surface of said sliding block,
    a pair of cutouts formed within said lower surface of said sliding block including a pair of unilaterally open grooves opening into said undergrabbing prong and symmetrically arranged on opposite sides of said webs along said longitudinal axis;
    a resilient element arranged in each of said cutouts, each resilient element protruding from said undergrabbing prong to resiliently engage a lateral surface of said channel of said profile member such that said snap tooth and said undergrabbing prong are each biased against a respective one of said undercut portions of said profile member during sliding of said sliding block within said channel; and
    a fixing element threadably engaging a hole in said sliding block and engagable with said bottom surface of said channel to fix said snap tooth and said undergrabbing prong against said respective undercut portions.

2. Device as claimed in claim 1, wherein each resilient element is a web with an integrally formed tongue, wherein two said resilient elements in an area of the webs are mutually connected by a linking part to form an integral part.

3. Device as claimed in claim 2, wherein said linking part has two integrally formed snap webs engaging with a snap cutout, formed in said lower surface of said sliding block between said cutouts.

4. Device as claimed in claim 1, wherein said resilient elements are coil springs.

5. Device as claimed in claim 1, wherein said cutouts are blind holes.

6. Device as claimed in claim 1, wherein said resilient elements are wire springs.

7. Device as claimed in claim 1, wherein said resilient elements are wire springs mutually connected by an arc part into an arc wire spring, wherein said arc part of said arc wire spring protrudes from said undergrabbing prong of said sliding block.

8. Device as claimed in claim 7, wherein each said cutout has on a respective lateral wall a slanted hole to receive a free end of said arc wire spring.

9. Device as claimed in claim 1, wherein said resilient elements are made of materials having elastic properties.

10. Device as claimed in claim 9, said resilient elements are formed of plastics.

11. Device as claimed in claim 9, wherein said resilient elements are formed of metallic materials.

* * * * *